United States Patent [19]

Fujii

[11] Patent Number: 5,381,242
[45] Date of Patent: Jan. 10, 1995

[54] FACSIMILE APPARATUS AND ITS MAINTENANCE CHARGE CONTROL APPARATUS

[75] Inventor: Yoshiharu Fujii, Sukurai, Japan

[73] Assignee: Sharp Kabushiki Kaisha, Osaka, Japan

[21] Appl. No.: 12,136

[22] Filed: Jan. 29, 1993

[30] Foreign Application Priority Data

Feb. 3, 1992 [JP] Japan ................................. 4-017694
Feb. 28, 1992 [JP] Japan ................................. 4-043447

[51] Int. Cl.$^6$ ........................ H04N 1/00; H04N 1/32; H04N 1/34; H04M 11/00
[52] U.S. Cl. .................................. 358/468; 358/400; 358/406; 379/100; 379/123; 379/132
[58] Field of Search ....................... 358/400, 468, 406; H04N 1/34; 379/100, 123, 132

[56] References Cited

U.S. PATENT DOCUMENTS

| | | | |
|---|---|---|---|
| 4,876,606 | 10/1989 | Banno et al. | 358/434 |
| 4,891,836 | 1/1990 | Takahashi | 379/100 |
| 4,956,721 | 9/1990 | Tasaki et al. | 358/468 |

FOREIGN PATENT DOCUMENTS

| | | | |
|---|---|---|---|
| 0241255 | 4/1987 | European Pat. Off. | |
| 0429048 | 11/1990 | European Pat. Off. | |
| 0225970 | 10/1986 | Japan | H04N 1/34 |
| 0278873 | 12/1987 | Japan | H04N 1/34 |
| 0098380 | 4/1991 | Japan | H04N 1/34 |
| 3-162055 | 7/1991 | Japan | |
| 4041598 | 6/1992 | Japan | H04N 1/34 |
| 4293355 | 10/1992 | Japan | H04N 1/34 |

OTHER PUBLICATIONS

U.S. application 08/005,362.

Primary Examiner—Edward L. Coles, Sr.
Assistant Examiner—Kimberly A. Williams
Attorney, Agent, or Firm—Nixon & Vanderhye

[57] ABSTRACT

A facsimile apparatus and a maintenance charge control apparatus capable of easily controlling and settling the maintenance charge of the apparatus. By responding to the transmission request instruction signal transmitted from the control apparatus, the facsimile apparatus transmits the count of the sheet counter to the control apparatus. The control apparatus causes the calculation of the maintenance charge by a maintenance charge calculator in response to the received count, and further issues a bill produced by a bill issuing means device on the basis of the calculated maintenance charge, and converts the bill into image data for transmission to the facsimile apparatus. When the maintenance charge is paid by the user in response to the transmitted bill, the paid-in information is entered from a keyboard to the control apparatus. The control apparatus issues a receipt by a receipt issuing device on the basis of the entered paid-in information, converts the receipt into image data, and transmits The image data to the facsimile apparatus. In the facsimile apparatus, the bill and receipt are recorded by the recording means.

7 Claims, 9 Drawing Sheets

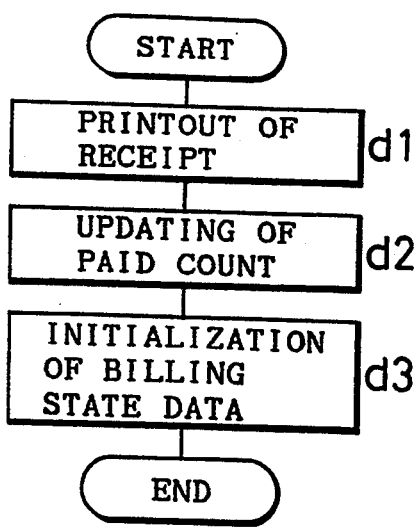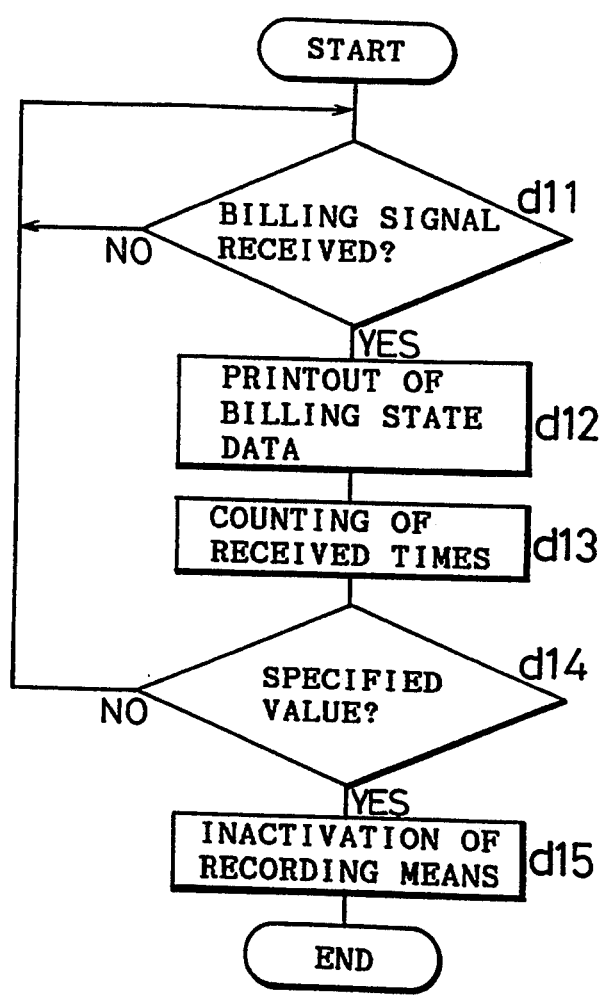

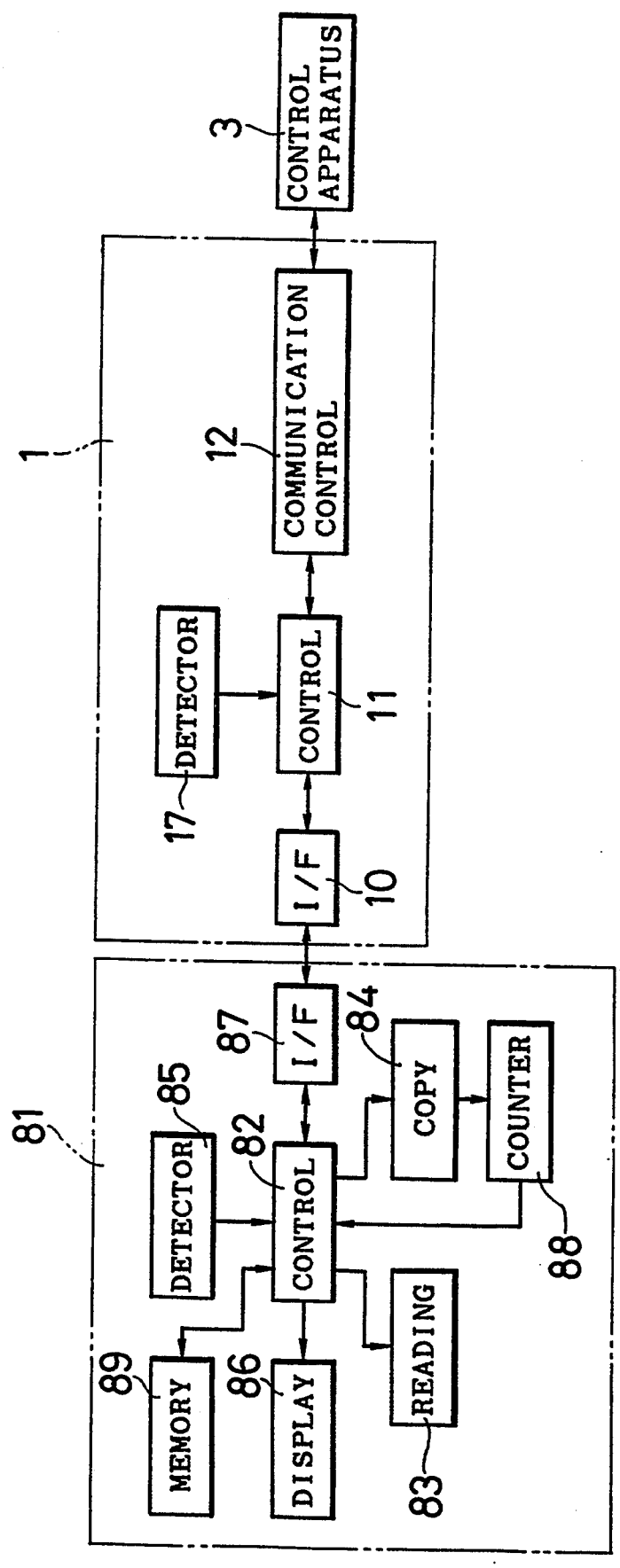

FACSIMILE APPARATUS AND ITS MAINTENANCE CHARGE CONTROL APPARATUS

BACKGROUND OF THE INVENTION

1. Field of the invention

The invention relates to a facsimile apparatus and its maintenance cost control apparatus for transmitting various information necessary for control of maintenance charges of the apparatus through general public telephone networks.

2. Description of the related art

The use of facsimile apparatus of the type capable of forming images on plain paper by employing a copying process is increasing, and the rate of troubles occurring in the mechanism employing such a copying process is high. It is desired to strengthen the service organization for maintenance and control purposes due to the necessity of periodic overhaul for maintenance of performance, and in particular quick and accurate countermeasures are required in order to correct troubles promptly.

In the conventional method of maintenance and control, generally, the facsimile apparatus itself detects its own condition, and indicates the nature of trouble or the expected replacement times of specific parts by its display or the like, or displays the nearly empty state of consumable parts, indicating the consumable parts are about to end, so as to inform the user. The user recognizes the state, and if it is considered necessary to call a serviceman, it is reported to the maintenance service station assigned for maintenance and control of the facsimile apparatus by telephone or other means.

Such telephone communication, however, gives rise to the following problems.

(1) The user cannot do his own work when explaining the trouble, and loses time.

(2) The user may misunderstand the trouble message, and wrong information may be transmitted to the maintenance service station.

(3) The user may not notice the trouble message, and in such a case a minor trouble may be promoted to major trouble.

(4) The maintenance service station sends the serviceman by preparing necessary repair parts after receiving the report from the user, and prompt countermeasure is difficult.

More recently, it has been proposed to do maintenance and control by a method in which the user's facsimile detects the own operating state, converts the detected data to communication information, sends it automatically or from the maintenance service station, where the maintenance service station receives the transmitted communication information, and converts it, for example, into character information and prints out the operating state of the user's facsimile (Japanese Patent Application Hei. 1-302749).

For operating such facsimile apparatus smoothly, maintenance control such as supply of consumable parts, periodic inspection of mechanical parts, replacement of parts, and repair of defective parts due to trouble should be clone timely. The maintenance control is generally achieved by a maintenance control agreement contracted between the user and the maintenance service company, and the serviceman of the maintenance service company visits the user periodically or upon request by the user. On that occasion, reading out the counting of the recorded paper counter built in the facsimile apparatus, the maintenance charge is calculated by adding a basic charge to the product of the counting and the unit price, and the amount is billed to the user.

In such control of maintenance charges, the serviceman must visit the user, and it takes much time and labor.

Additionally, the billing and payment status for maintenance charges are known only by specific people in the accounting group of the service company, and are unknown to other people.

SUMMARY OF THE INVENTION

It is hence a primary object of the invention to present a facsimile apparatus and its maintenance charge control apparatus which is capable of controlling and settling the maintenance charge for the apparatus easily.

The invention includes a facsimile apparatus connected to a maintenance charge control apparatus for controlling the maintenance charge through general public circuits networks, comprising:

means for recording image data on a recording paper, means for counting the number of sheets recorded by the recording means, means for storing the number of sheets corresponding to the paid maintenance charge, and means for controlling by transmitting the counting of the counting means to the maintenance charge control apparatus, and storing the number of sheets from the maintenance charge control apparatus in the storing means.

The invention also includes a facsimile apparatus further comprising key input means and display means, wherein the controlling means displays the stored value in the storing means on the display means, responsive to a predetermined key operation by the key input means.

The invention also includes a maintenance charge control apparatus of a facsimile apparatus connected to the facsimile apparatus through general public telephone networks, comprising:

detecting means for causing the transmission of the count of the counting means for the facsimile apparatus, and storing the received count, maintenance charge calculating means for calculating the maintenance charge on the basis of the count as directed by the output of the detecting means, bill issuing means for convening the bill prepared on the basis of the calculated maintenance charge into image data and transmitting the image data, amount input means for entering the amount of the maintenance charge paid by the user of the facsimile apparatus, receipt issuing means for converting the receipt prepared on the basis of the entered amount of the maintenance charge into image data and transmitting the image data, and setting means for transmitting the number of sheets corresponding to the paid number of sheets to the storing means of the facsimile apparatus.

According to the invention, the facsimile apparatus transmits the count of the counting means to the maintenance charge control apparatus in response to the instruction from the maintenance charge control apparatus. Consequently, the maintenance charge control apparatus calculates the maintenance charge on the basis of the received count, and bills the calculated maintenance charge to the user of the facsimile apparatus. In the facsimile apparatus, the number of sheets from the maintenance charge control apparatus is set as the memory value in the storing means. As a result, after calculating and billing the maintenance charge by reading out the count of the counting means of the facsimile apparatus, the number of paid sheets in the storing means can be updated when the maintenance charge is paid.

Thus, the number of sheets recorded by the recording means in the facsimile apparatus can be transmitted through general public telephone networks, and the number of paid sheets in the storing mean can be updated.

Also according to the invention, when a predetermined key operation by key input means of the facsimile apparatus is effected, the number of sheets in the storing means is displayed in the display means. Hence, the user of the facsimile apparatus knows that the number of sheets in the storing means has been updated by paying the maintenance charge, so that the user may feel relieved.

Moreover, in the invention, the maintenance charge control apparatus connected to the facsimile apparatus through general public telephone networks detects the counting of the counting means of the facsimile apparatus through a detecting means, and calculates the maintenance charge on the basis of the counting detected by the maintenance charge calculating means. Afterwards, the bill issuing means issues a bill according to the calculated maintenance charge, and converts the bill into image data, and transmits to the facsimile apparatus.

When the user pays the maintenance charge on the basis of the transmitted bill, by entering the amount of the paid maintenance charge by the amount input means, the receipt issuing means issues a receipt on the basis of the entered amount, and converts the receipt into image data and transmitted to the facsimile apparatus. Consequently, the number of sheets is transmitted to the facsimile apparatus from the maintenance charge control apparatus, and the storing means in the facsimile apparatus is updated.

Thus, in the invention, the number of sheets recorded by the recording means in the facsimile apparatus is known through general public telephone networks, and the number of sheets in the storing means is updated. Therefore, unlike the prior art, it is not necessary for the serviceman to visit the user, and the labor in control and adjustment of maintenance charge may be saved.

Also according to the invention, when a predetermined key operation by key input means of the facsimile apparatus is effected, the number of sheets in the storing means is displayed in the display means, so that the user of the facsimile apparatus knows that the number of sheets in the storing means has been updated by paying the maintenance charge, and the user may feel relieved.

Furthermore, in the invention, the maintenance charge control apparatus connected to the facsimile apparatus through general public circuits networks detects the counting of the counting means in the facsimile apparatus, and calculates the maintenance charge on the basis of the detected counting. Afterwards, a bill is issued on the basis of the calculated maintenance charge, and the bill is converted into image data, and transmitted to the facsimile apparatus. When the user pays the maintenance charge on the basis of the transmitted bill, by entering the amount of the paid maintenance charge, a receipt is issued on the basis of the entered amount, and the receipt is converted into image data and is transmitted to the facsimile apparatus. Consequently, the number of sheets is transmitted to the facsimile apparatus from the maintenance charge control apparatus, and the storing means in the facsimile apparatus is updated. Thus, the maintenance charge may be controlled, billed and settled from the maintenance charge control apparatus side to the facsimile apparatus side without requiring the visit of a serviceman, so that convenience may be enhanced.

The invention further presents a facsimile apparatus connected to a maintenance charge control apparatus for controlling the maintenance charge through general public telephone networks, comprising:

means for recording image data in a recording paper, means for counting the number of sheets recorded by the recording means, first means for storing the number of sheets corresponding to the paid maintenance charges, second means for storing the billing state data which includes the number of sheets corresponding to the unpaid maintenance charge, the billing amount, the billing date and the bill number, and means for controlling by transmitting the counting of the counting means and the number of sheets of the first storing means in response to a transmission request signal from the maintenance charge control apparatus, and storing the number of sheets and billing state data given from the maintenance charge control apparatus respectively in the first storing means and second state storing means.

In the invention, the controlling means prints out the stored billing state data to the recording paper by the recording means, when the billing state data given from the maintenance charge control apparatus is stored in the second storing means.

Also in the invention, the controlling means counts the number of receptions of the billing state data given from the maintenance charge control apparatus, stores in the second storing means, and deactivates at least the recording means when the reception number reaches a predetermined number.

In the invention, the facsimile apparatus also comprises key input means and display means, and the controlling means corresponds to a predetermined key operation of key input means, and indicates the counting of the counting means, stored content of the first storing means, and stored content of the second storing means, selectively by printing out through recording means or visually displaying the data by display means.

According to the invention, the facsimile apparatus transmits the counting of the counting means and the number of the first storing means to the maintenance charge control apparatus, responsive to a transmission request signal from the maintenance charge control apparatus. Accordingly, the maintenance charge control apparatus calculates the maintenance charge on the basis of the value subtracting the number of sheets from the received count, and bills the calculated maintenance charge to the use of the facsimile apparatus. The facsimile apparatus stores the information expressing the billing state from the maintenance charge control apparatus in the second storing means, and sets the number of sheets as the memory value in the first storing means.

Subsequently, reading out the count of the counting means of the facsimile apparatus and the number of the first storing means, the maintenance charge is calculated and billed, and then the billed maintenance charge, that is, the billing state data such as the number of sheets corresponding to the unpaid maintenance charge is transmitted to the facsimile apparatus, and stored in the second storing means. When the maintenance charge is paid by the user, the number of sheets in the first storing means is updated.

In this way, the number of recorded sheets and the number of sheets corresponding to the paid maintenance charge in the facsimile apparatus can be known through general public telephone networks, and the number of sheets in the first storing means can be updated. At the same time, the billing state data of the maintenance charge in the facsimile apparatus is stored in the second storing means. Therefore, unlike the prior art, the serviceman does not have to visit the user, and the labor involved in control, settling and billing of the maintenance charge can be saved.

In the invention, moreover, when the billing state given from the maintenance charge control apparatus is stored in the second storing means, the stored billing state data are issued and recorded on recording paper at the facsimile apparatus. As a result, the user of the facsimile apparatus can recognize the billing state data stored in the apparatus, so that the user may feel relieved. By producing the billing state data, the maintenance charge may be billed and disclosed to the user.

Also according to the invention, the number of times the billing state data are recorded from the maintenance charge control apparatus is counted and stored in the second storing means. When the reception number reaches a predetermined number, the recording means is deactivated. At this time, the entire apparatus may be deactivated. Hence, if the maintenance charge is not paid by the user, the recording means may be deactivated to warn the user, so that the maintenance charge may be collected in a secure manner.

Further according to the invention, corresponding to a predetermined key operation from key input means, the count of the counting means, the stored content of the first storing means, and the stored content of the second storing means are selectively printed out on a recording paper by recording means, or visually displayed by display means. Hence, when the serviceman visits the user for maintenance checking or repairing of the apparatus, various information necessary for maintenance charge control set in the apparatus can be read out, and the user informed, so that the maintenance charge can be negotiated with the user.

In this way, according to the invention, the number of recorded sheets and the number of sheets corresponding to the paid maintenance charge in the facsimile apparatus can be known through the use of general public telephone networks, and the number of sheets in the first storing means can be updated. At the same time, the second of the maintenance charges in the facsimile apparatus is stored in the second storing means. Therefore, unlike the prior art, the serviceman does not have to visit the user, and the labor involved in control, settling and billing of maintenance charges can be saved.

In the invention, moreover, when the billing state data sent from the maintenance charge control apparatus is stored in the second storing means, the stored billing state data is printed on recording paper, so that the user of the facsimile apparatus can recognize the billing state data stored in the apparatus, and the user may feel relieved. By producing the billing state data, the maintenance charge may be billed and the user informed.

Also, according to the invention, a counting of the number of times the billing state data are sent from the maintenance charge control apparatus is stored in the second storing means. When the reception number reaches a predetermined number, the recording means is deactivated. At this time, the entire apparatus may be deactivated. Hence, if the maintenance charge is not paid by the user, the recording means may be deactivated to warn the user, so that the maintenance charge may be collected in a secure manner.

Further according to the invention, corresponding to a predetermined key operation from key input means, the count of the counting means, the stored content of the paid first storing means, and the stored content in the second storing means are selectively printed out on a recording paper by recording means, or visually displayed by display means. Hence, when the serviceman visits the user for maintenance checking or repairing of the apparatus, various information necessary for maintenance charge control set in the apparatus can be read out, and the user informed, so that the maintenance charge can be negotiated with the user.

BRIEF DESCRIPTION OF THE DRAWINGS

Other and further objects, features, and advantages of the invention will be more explicit from the following detailed description taken with reference to the drawings wherein:

FIGS. 7(A) and 7(B) are flow charts for explaining the operation after maintenance charge billing in the facsimile apparatus 1.

FIG. 9 is a block diagram for explaining other operation of the facsimile apparatus 1.

DESCRIPTION OF THE PREFERRED EMBODIMENTS

Figure 1:
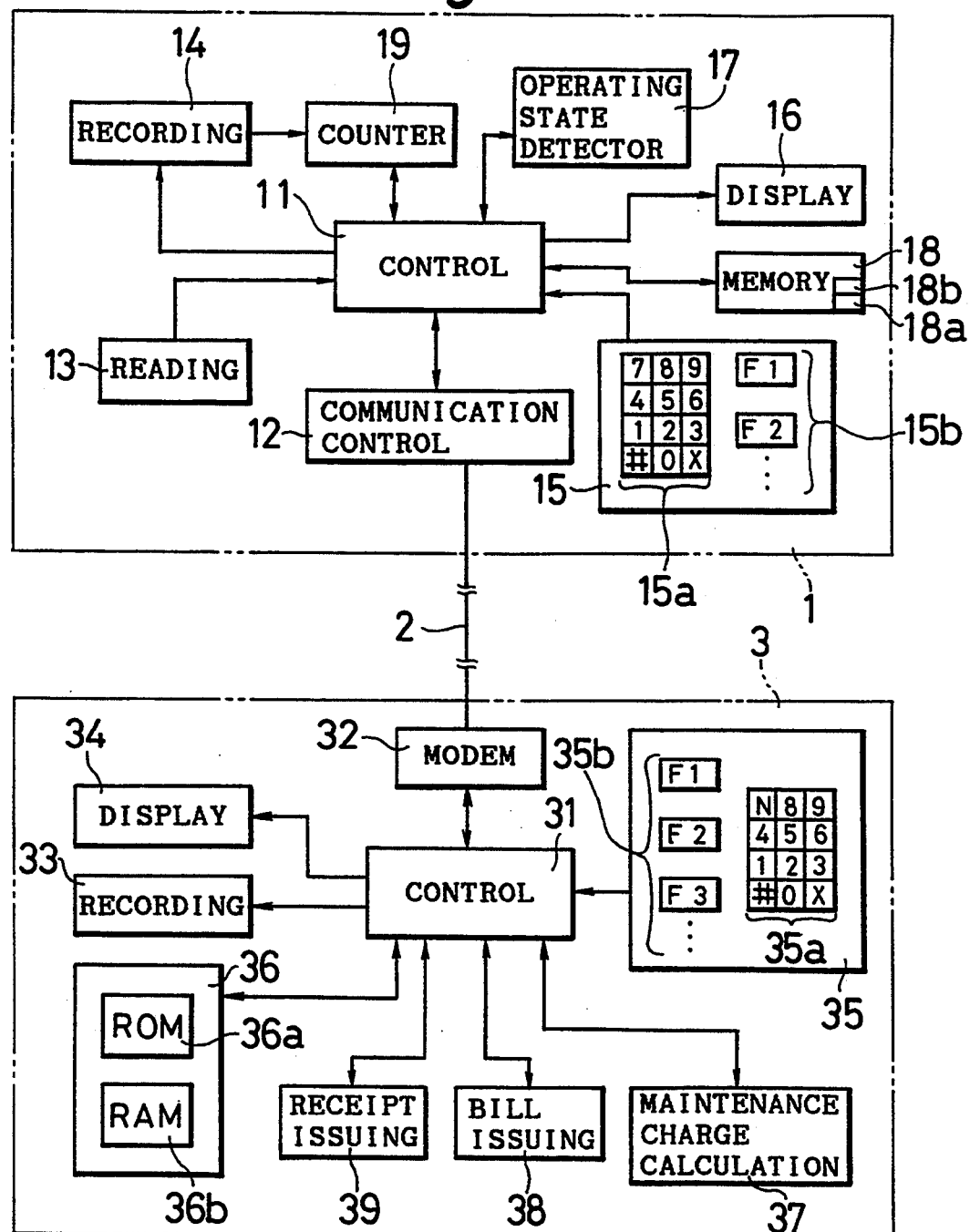
FIG. 1 is a block diagram showing a basic configuration of an embodiment of the invention.

Now referring to the drawing, preferred embodiments of the invention are described below.

FIG. 1 is a block diagram showing a basic configuration of an embodiment of the invention. A facsimile apparatus 1 is connected to a public telephone circuit 2, and transmits and receives image data with other facsimile apparatus, and also transmits and receives various information with a control apparatus 3 which is a maintenance charge control apparatus described later through the public telephone circuit 2. The facsimile apparatus 1 executes an electrostatic copying process for recording (transferring) on recording paper by forming a charged image.

The facsimile apparatus 1 is realized by a microcomputer and others, and comprises control means 11 for controlling the entire apparatus. The control means 11 is connected with communication control 12, reading means 13, recording means 14, operating means 15, display means 16, operating state detecting means 17, memory 18, and sheet counter 19.

The communication control means 12 comprises an incoming detecting circuit, a modem and other elements, and demodulates received image data which are applied to the control means I 1, as well as modulating the image data to be transmitted to the public telephone circuit 22. The reading means 13 comprises a charged coupled device (CCD) described below, lens, exposure device and other conventional elements for optically reading and transmitting the document, as well as converting into electrical signals (image data) and applying them to the control means 11. When copying the document, it exposes the document, and focuses a document image on the surface of the photosensitive material provided in the recording means 14.

The recording means 14 comprises the photosensitive material, developing device, charger, fixer and conventional elements, and transfers the image onto the recording paper by the electrostatic copying process. The sheet counter 19 counts the number of recordings by the recording means 14, and counts up by one every time a recording operation is over.

The operating means 15 comprises numeric input keys 15a, and various function setting keys 15b such as transmission key F1 and count display key F2. The display means 16 is a liquid crystal display device or other conventional display, and displays the input data from the operating means 15, and the operating state of the facsimile apparatus 1, such as error information and information indicating the end of the consumable parts.

The operating state detecting means 17 detects the operating site of the facsimile apparatus 1, more specifically the abnormal state, and applies the detected operating state to the control means 11. The control means 11 incorporates trouble nature determining means, trouble type determining means, and communication information convening means, which are not shown, and these means operate according to the control from the operating state detecting means 17.

The trouble nature determining means judges the nature of the trouble detected by the operating state detecting means 17. The trouble type determining means determines if the trouble is a kind that requires a serviceman call or not. The type of trouble that does not require a serviceman call is, for example, paper jamming, end of recording paper, or the like that can be relatively easily handled by the user. The type of trouble that requires a serviceman call is trouble that cannot be handled by the user, such as the end of service life of the photosensitive material of the recording means 14.

The memory 18 comprises a read-only memory (ROM), random access memory (RAM), and others, and programs for controlling the actions of the facsimile apparatus 1 are stored in the ROM, while the RAM offers a registration region for opening information transmitted from the control apparatus 3, memory region 18a for storing the number of sheets, corresponding to the paid maintenance charge, memory region 18b for storing the billing state data such as the number of sheets corresponding to the unpaid maintenance charge, and working region used for processing action by the control means 11.

The control apparatus 3 is basically composed of a so-called personal computer, and data is transmitted and received between the facsimile apparatus 1 and other terminal devices through the public telephone circuit 2. The control apparatus 3 comprises control means 31 implemented by a central processing unit (CPU) for controlling the entire apparatus, and others. The control means 31 is connected with modem 32, recording means 33, display means 34, operating means 35, and memory 36.

The modem 32 demodulates the data received from apparatus 1 and other devices through the public telephone circuit 2 and applies received data to the control means 31, as well as modulating the data to be transmitted which is output from the control means 31 and sent out to the public telephone circuit 2. The recording means 33 is implemented, for example, by thermal printer, and records the image data received through the public telephone circuit 2, various information received from other terminal devices, or the information entered through the operating means 35, on a thermal recording paper or the like.

The display means 34 is a cathode-ray tube (CRT) or other display device, and displays various information received through the public telephone circuit 2, information entered through the operating means 35, and various processing results from the control apparatus 3. The operating means 35 comprises plural key switches such as numeric input keys 35a, and various function setting keys 35b for specifying the operating state of the control apparatus 3.

The memory 36 comprises ROM 36a and RAM 36b, and the ROM 36a stores programs for controlling the processing actions of the control apparatus 31, and the RAM 36b stores the control information regarding plural facsimile apparatuses controlled by the control apparatus 3, maintenance charge information and other information, and also offers working regions used in processing actions by the control means 31.

The control means 31 is connected with maintenance charge calculating means 37, bill issuing means 38, and receipt issuing means 39. The maintenance charge calculating means 37 calculates the maintenance charge on the basis of the calculated value of the sheet counter 19 sent from the facsimile apparatus 1 according to the procedure mentioned below, or more specifically on the basis of the difference between the counting of the sheet counter 19 and the number in the memory region 18a. The maintenance charge is calculated by adding the basic charge to the product of the unit price and the counting.

The bill issuing means 38 issues a bill on the basis of the maintenance charge calculated by the maintenance charge calculating means 37, converts the bill into image data, and sends it out to the control means 31. The receipt issuing means 39 issues a receipt on the basis of the paid amount of maintenance charge entered through the operating means 35, and converts the receipt into image data, and sends it out to the control means 31. The bill created by the bill issuing means 38 and the receipt created by the receipt issuing means 39 are transmitted as image data to the facsimile apparatus 1 through the public telephone circuit 2.

Figure 2:
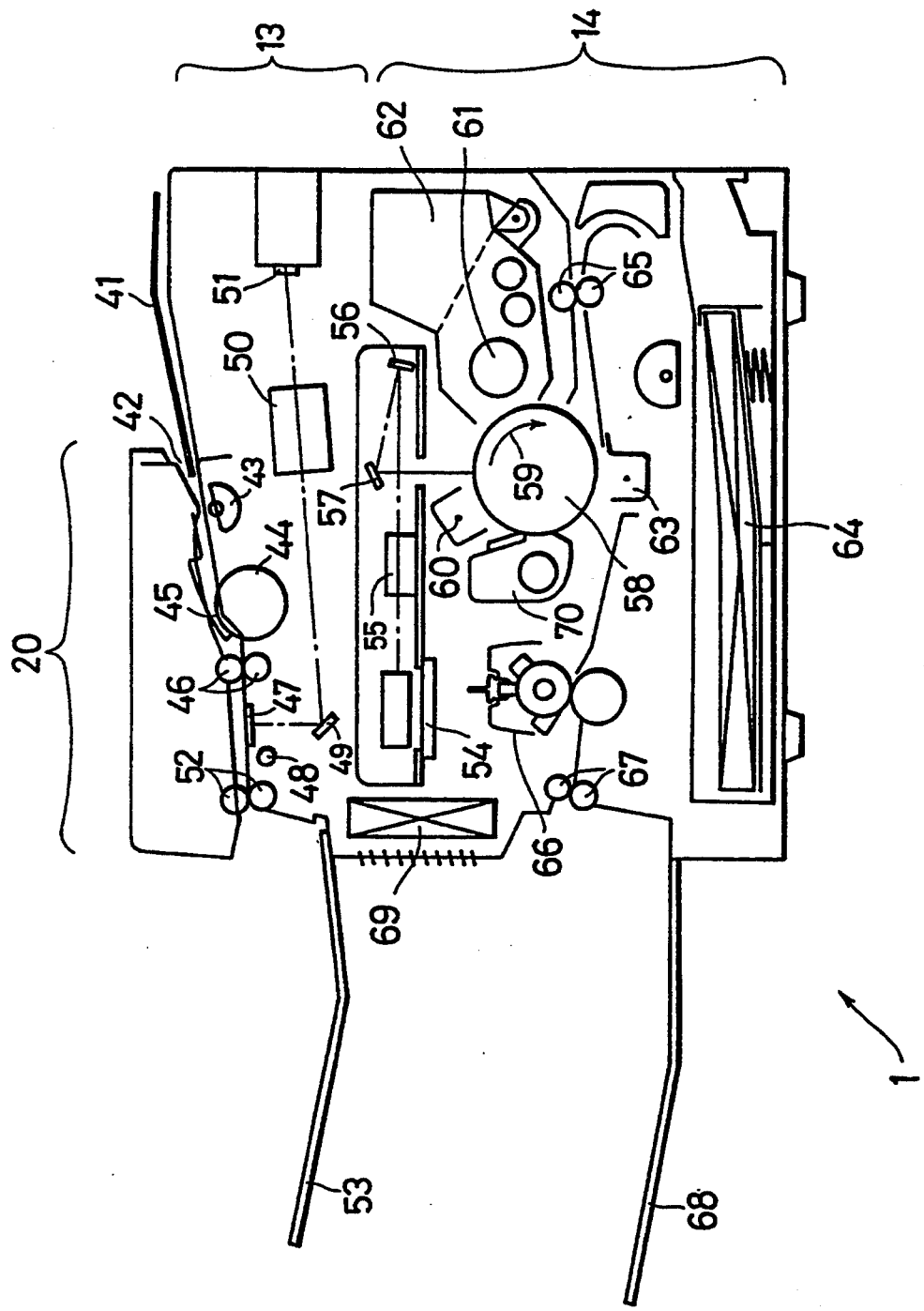
FIG. 2 is a sectional view showing the structure of a facsimile apparatus 1 shown in FIG. 1.

FIG. 2 is a sectional view showing the constitution of the facsimile apparatus 1. The facsimile apparatus 1 is roughly classified into reading means 13, recording means 14, and document conveying means 20. When a document 41 is inserted in a document inlet 42, setting of the document 41 is detected by a document sensor 43 realized by a microswitch or the like. Afterwards, when the copy key or send key is manipulated by the operator, conveying action of the document 41 is started.

When transmitting the document, the document is held and conveyed between a roller 44 and a pressing member 45, and is further conveyed by a pair of conveying rollers 46 to the exposure region where a transparent glass 47 is placed. In the exposure region, the light from a light source 48 is emitted to the document surface of the document 41, and its reflected light enters a CCD 51 through a mirror 49 and lens 50. By the CCD 51, the incident light is converted into an electric signal (image data), and is given to the control means 11. The document 41 after exposure is conveyed by a pair of discharge rollers 52, and is discharged onto a document tray 53.

At the downward side of the mirror 49 in FIG. 2, an exposure head 54 is disposed, and when copying the document 41, an electrostatic copying process is executed together with the above document conveying action. The document image exposed by the exposure head 54 is focused on a photosensitive drum 58 through lens 55 and mirrors 56, 57.

The photosensitive drum 58 is rotated in the direction of arrow 59. The surface of the photosensitive drum 58 is uniformly charged by a corona charger 60. Consequently, the portion other than the document image is illuminated by the exposure head 54, and the accumulated charge in the illuminated portion is removed, and the charge is left over on the document image portion, thereby forming an electrostatic latent image. In a developing device 61, a toner which is colored fine particles charged in the reverse polarity of the electrostatic latent image is supplied from a toner cartridge 62, and is deposited on the electrostatic latent image, thereby forming a visible image. A recording paper is overlaid on the toner image, and an electric charge in the reverse polarity of the toner charging polarity is applied to the recording paper by a transfer device 63 from the opposite side of the photosensitive drum 58 of the recording paper, and the toner image is transferred on the recording paper by the electrostatic power.

The recording paper is stored in a recording paper cassette 64, and is conveyed into a conveying path by means of paper feed roller and others not shown herein, and is supplied by a paper feed roller 65 into a transfer region where the transfer device 63 is installed.

The toner image transferred on the recording paper is fixed on the recording paper by applying heat or pressure by a fixing device 66. On the other hand, the latent image charge on the photosensitive drum 58 after transfer is destaticized by a destaticizer 70. The residual toner left over on the photosensitive drum 58 without being transferred is removed by a cleaner which is not shown in the drawing. By repeating a series of processes from charging to cleaning, the document images are continuously copied on the recording paper.

The recording paper on which the toner image is fixed is conveyed by a discharge roller 67, and is discharged in a discharge tray 68. Near the exposure head 54, a cooling fan 69 is installed in order to cool off the heat generation from the exposure head 54.

Below is explained the operation when initially installing the facsimile apparatus 1. The facsimile apparatus I is installed, for example, in the office of the user by the serviceman from the maintenance service company. At this point, the user of the facsimile apparatus 1 and the serviceman negotiates the contents of the contract. The contents of the contract include, among other things, the selection of the types of maintenance function, that is, what kind of information out of the automatic transmission functions of the operating state provided in the facsimile apparatus 1 should be transmitted to the control apparatus 3 installed in the maintenance service company to request maintenance services.

Afterwards, the serviceman transmits the contract contents to the control apparatus 3 by the facsimile communication. The contents of the contract include, side from the negotiated selection of types of maintenance functions, the information relating to the installed facsimile apparatus 1, such as the name of the subscriber, the model name of the installed apparatus, its serial manufacturing number, and date of agreement. Successively, at the control apparatus 3 side, on the basis of the contract contents received through facsimile communication, the opening information for opening (activating) the automatic transmission function of the facsimile apparatus 1 is entered through the operating means 35. When the opening key of the control apparatus 3 is pressed, the input opening information is transmitted to the facsimile apparatus 1.

The facsimile apparatus receives the opening information transmitted from the control apparatus 3, and registers it in the opening information registration region set in the memory 18 by the control means 11. This opening information includes the telephone number of the transmission destination by the automatic transmission function, contract number, and information for activating the automatic transmission function. The opening information received later is recorded in the recording paper by the recording means 14. Thus, the user and the serviceman can recognize the opening information set in the facsimile apparatus 1, that is, the contents of the contract. In this procedure, the automatic transmission function of the operating state in the facsimile apparatus 1 is activated.

The automatic transmission function of the operating state of the facsimile apparatus 1 is explained below.

Figure 3:
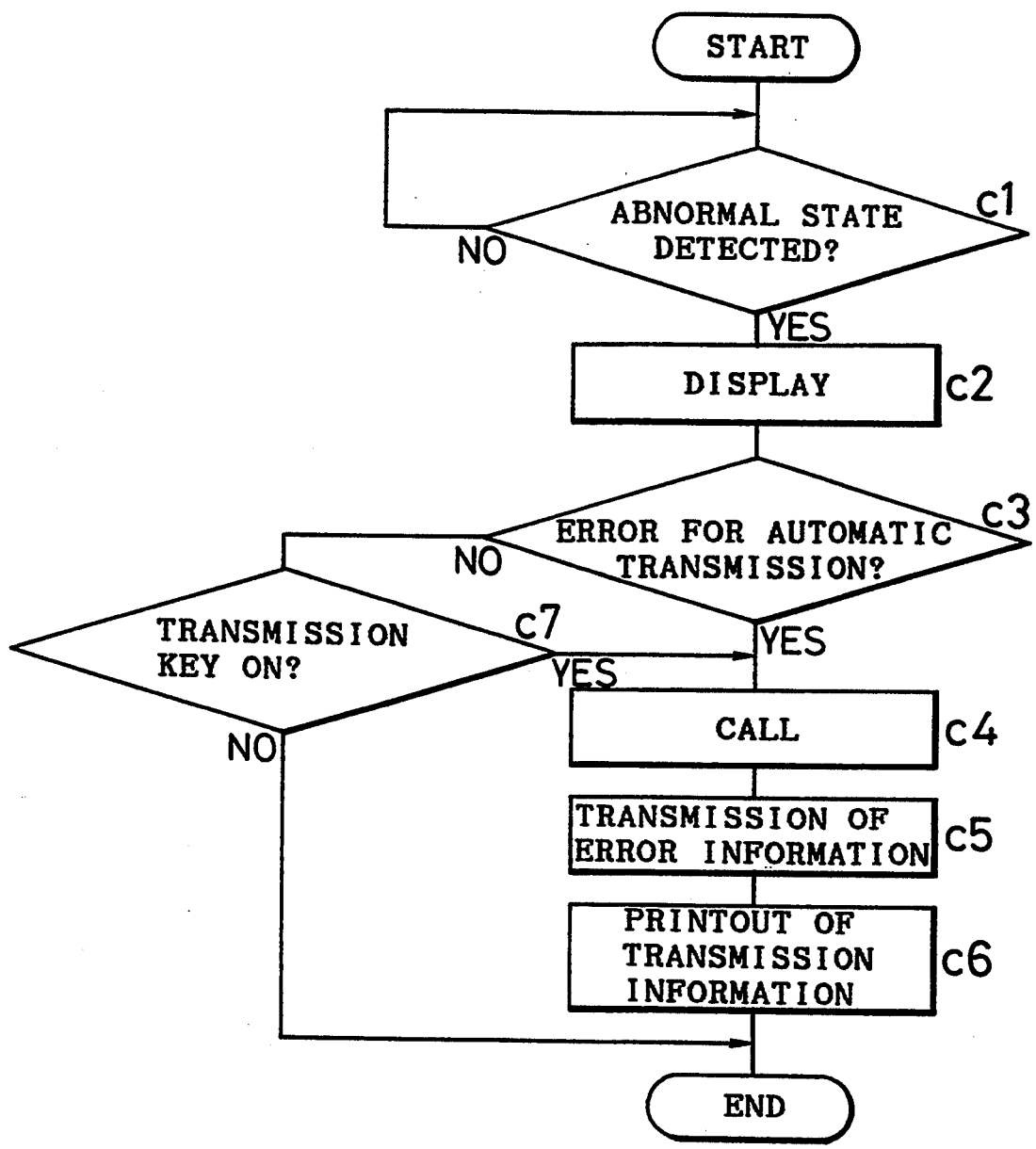
FIG. 3 is a flow chart for explaining the operation of the facsimile apparatus 1.

FIG. 3 is a flow chart for explaining the automatic transmission function of the facsimile apparatus 1. At step c1, when the operating state (abnormal state) is detected by the operating state detecting means 17, the detected abnormal state is displayed at step c2 in the display means 16.

At step c3, the control means 11 judges whether the detected abnormal state is to be transmitted automatically or not. That is, end of recording paper, paper jamming or other troubles that can be handled by the user does not require automatic transmission, and in these cases, or in other cases of troubles that are not included in the contents of the contract of the opening information, the operation advances to step c7. Or, in the event of troubles that cannot be handled by the user, such as the end of life of the photosensitive drum 58 that must be replaced, the operation proceeds to step c4 to transmit the detected abnormality.

At step c4, among the registered opening information, the telephone number of the control apparatus 3 is read and called, and, at step c5, the detected abnormal state, such as the information requiring replacement of photosensitive drum 58 or error information is transmitted.

At step c6, the information transmitted to the control apparatus 3 is printed out on a recording paper by the recording means 14. As a result, the user can recognize that the automatic transmission function of the facsimile apparatus 1 is working normally, and the information transmitted to the control apparatus 3 can be recognized, so that the user may feel relieved.

At step c7, when the send key in the operating means 15 is pressed, the operation goes to step c4, and the information showing the detected abnormal state is similarly transmitted to the control apparatus 3. Such action is called manual transmission function.

Figure 4:
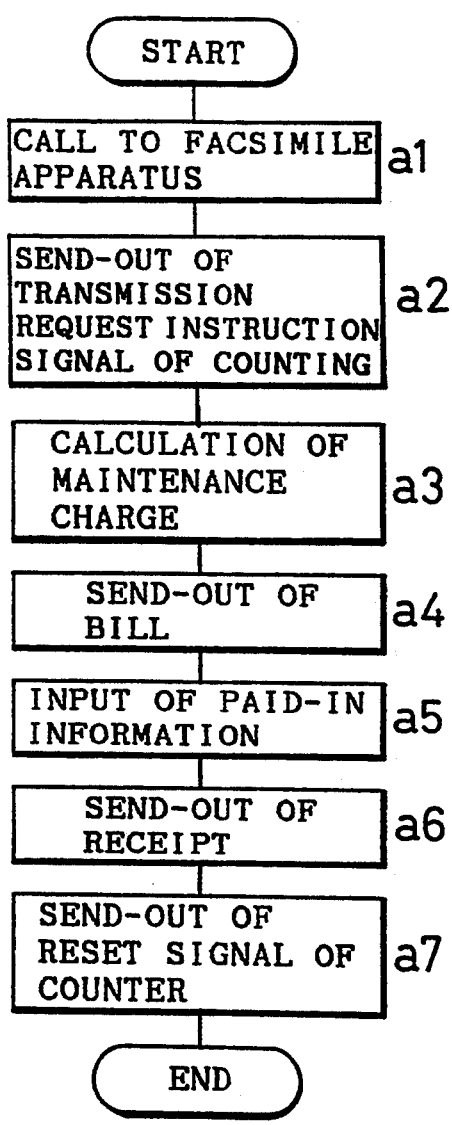
FIGS. 4(A) and 4(B) are flow charts for explaining the operation of maintenance charge control between the facsimile apparatus 1 and control apparatus 3.
Figure 4:
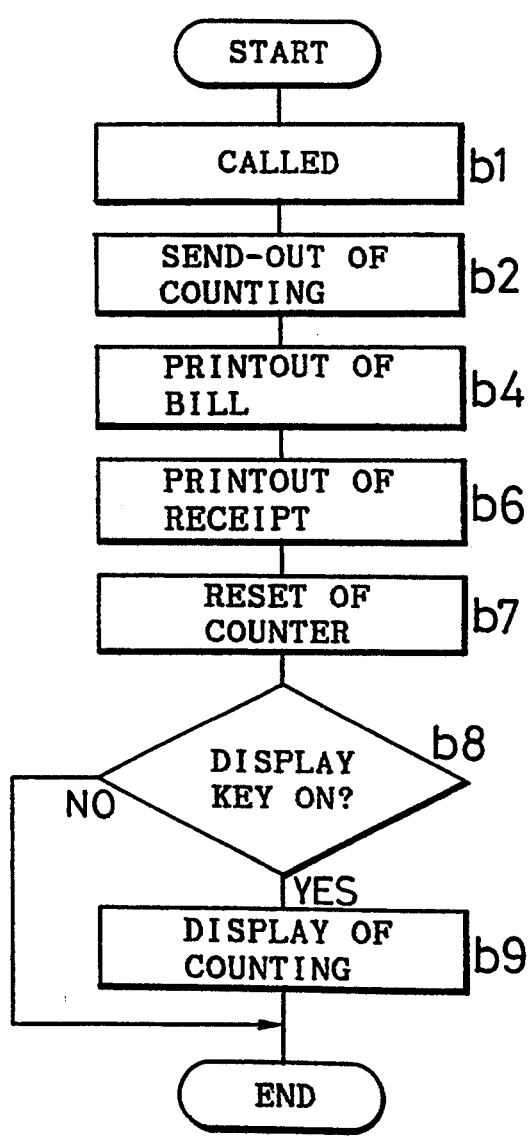

FIG. 4 is a flow chart for explaining the operation when settling the maintenance charge of the facsimile apparatus 1 by the control apparatus 3. FIG. 4(A) shows the operation of the control apparatus 3, and FIG. 4(B) refers to the operation of the facsimile apparatus 11, and in FIGS. 4(A) and 4(B), the corresponding steps are identified with same numbers. For example, step a1 corresponds to step b1, and so forth.

Referring first to FIG. 4(A), the operation of the control apparatus 3 is described below. At step a1, the telephone number of the facsimile apparatus 1 is entered and called from the numeric input keys 35a of the operating means 35. At step a2, of the function setting keys 35b provided in the operating means 35, by pressing, for example, key F1, a signal instructing transmission request of the number of sheets, which is the count of the sheet counter 19, is transmitted to the control means 11 of the facsimile apparatus 1.

At step a3, the maintenance charge is calculated by the maintenance charge calculating means 37 on the basis of the number of sheets transmitted in correspondence to the transmission request instruction signal. At step a4, successively, the control means 31 gives the maintenance charge which is the output from the maintenance charge calculating mans 37 to the bill issuing means 38, and a bill is issued. The bill is converted into image data and given to the control means 31. The control means 31 transmits the image data which is the given bill to the facsimile apparatus 1 by pressing, for example, key F2 of the function setting keys 35b provided in the operating means 35.

When the maintenance charge according to the transmitted bill at step a4 is paid, the paid-in information from the operating means 35 to the control apparatus 3 is entered by the operator at step a5. At step a6, the control means 31 gives the entered paid-in information to the receipt issuing means 39 to issue a receipt. The issued receipt is converted into image data, and given to the control means 31. The control means 31 transmits the image data as the given receipt to the facsimile apparatus 1 by pressing, for example, key F3 of the function setting keys 35b provided in the operating means 35.

Afterwards at step a7, the control means 31 sends out the paid number of recorded sheets for storing in the region 18a of the memory 18 to the control means 11 of the facsimile apparatus 1.

Referring then to FIG. 4(B), the operation of the facsimile apparatus 1 is explained. At step b 1, when called from the control apparatus 3, the control means 11 sends out, at step b2, the number of sheets which is the counting of the sheet counter 19 to the control apparatus 3, corresponding to the transmission request instruction signal sent from the control apparatus 3. Hence, the calculation of the maintenance charge at step a3 is conducted in the control apparatus 3.

At step b4, receiving the image data which is the bill sent from the control apparatus 3, the image data is printed out by the recording means 14, so that the bill is produced. The user of the facsimile apparatus 1, pays the maintenance charge to the maintenance service company commissioned for the control of the facsimile apparatus 1.

At step b6, the image data is received as the receipt sent from the control apparatus 3, and the image data is printed out by the recording means 14, and the receipt is issued. As a result, the maintenance charge is settled between the user of the facsimile apparatus 1 and the maintenance service company.

At step b7, according to the signal transmitted from the control apparatus 3, the control means 11 updates the number of paid recorded sheets to the region 18a of the memory 18. In this updating, the value added by the portion of the recorded sheets corresponding to the paid maintenance charge is set.

At step b8, when the count display key F2 in the operating means 15 is pressed, the control means 11 displays, at step b9, the number of paid recorded sheets in the region 18a of the memory 18 in the display means 16. As a result, the user of the facsimile apparatus 1 confirms that the number of paid recorded sheets is updated by the payment of the maintenance charge, so that the user may feel relieved.

Thus, according to the embodiment, the personal communication between the facsimile apparatus 1 and the control apparatus 3 sites, that is, between the user and the maintenance service company may be minimized, and the procedure of control of maintenance charge, billing, settling, and receipt issuing can be simplified. Thus, the maintenance control of the facsimile apparatus 1 may be done more smoothly, which is convenient for both the user of the facsimile apparatus 1 and the maintenance service company which offers the maintenance control of the facsimile apparatus 1.

Figure 5:
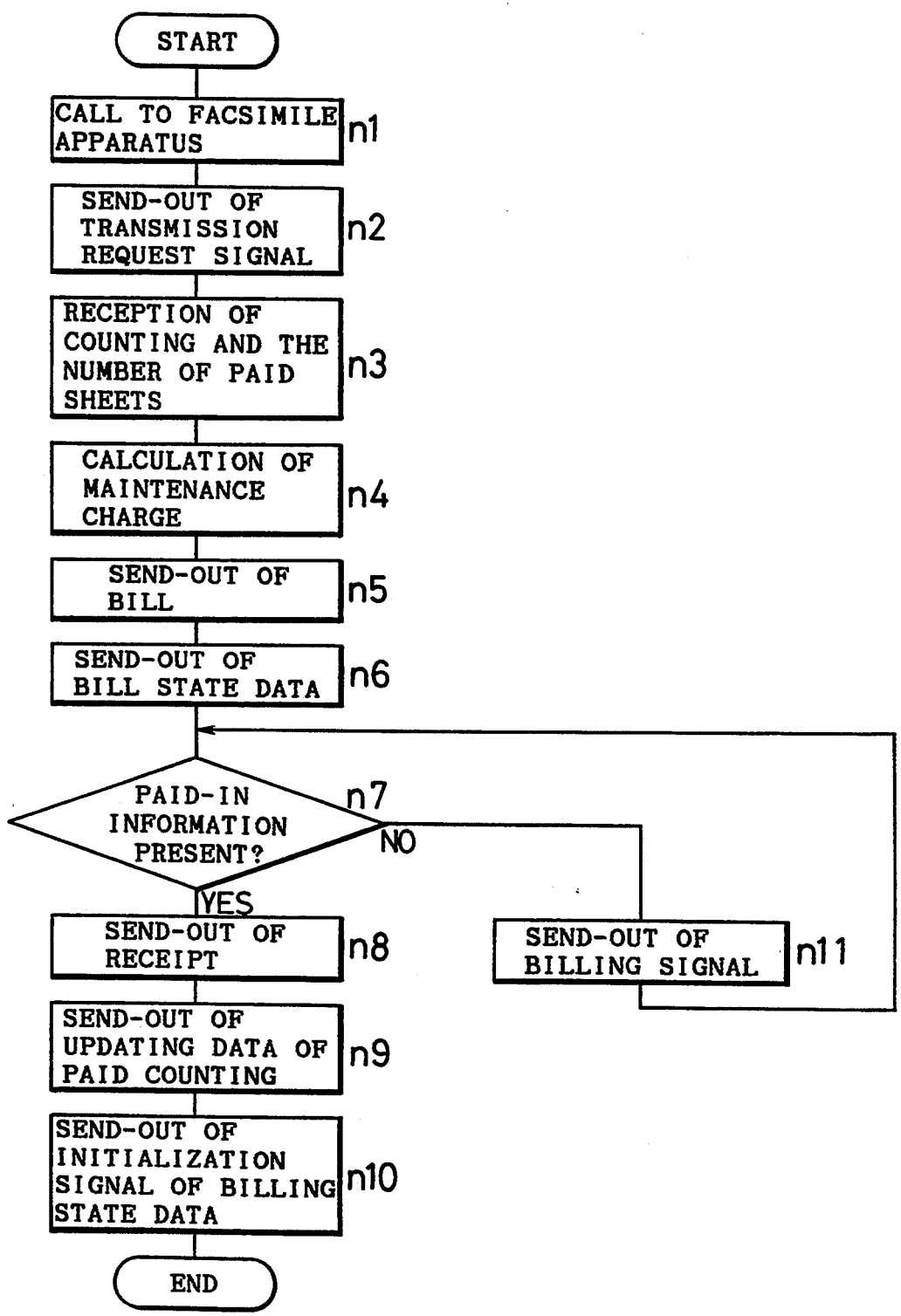
FIG. 5 is a flow chart for explaining the operation in maintenance charge control in the control apparatus 3.

FIG. 5 is a flow chart for explaining the operation of settling and billing of maintenance charge of the facsimile apparatus 1 by the control apparatus 3. At step n1, the telephone number of the facsimile apparatus 1 is entered and called, for example, via the numeric input keys 35a of the operating means 35. At step n2, by pressing, for example, key F1 of the function setting keys 35b provided in the operating means 35, a signal instructing transmission request of the count of the sheet counter 19 and the number of paid sheets in the memory region 18a is sent to the control means 11 of the facsimile apparatus 1. At step n3, the count and the paid number transmitted from the facsimile apparatus 1 are received.

At step n4, the maintenance charge is calculated in the maintenance charge calculating means 37, on the basis of the received counting and paid number. The billing amount Y of the maintenance charge is calculated in the following equation (1), presuming the count of the sheet counter 19 to be N, the number of paid sheets to be n0, the basic charge to be B, and unit price per sheet to be k.

$$Y = B + k(N - n0) \quad Y = B + k(N - n0) \tag{1}$$

At step n5, in succession, the control means 31 applies the billing amount Y which is the output from the maintenance charge calculating means 37 to the bill issuing means 38, and a bill is issued. The bill is converted into image data, and given to the control means 31. The control means 31 sends out the image data of the bill to the facsimile apparatus 1 by pressing, for example, key F2 of the function setting keys 35b provided in the operating means 35. At step n6, the billing state data to be set and registered in the memory region 18b in the memory 18 in the facsimile apparatus 1 is sent out. The billing state data includes the billing amount Y, date d, and bill number b.

At step n7, the billing amount Y is paid on the basis of the bill sent at step n5, and when the paid-in information is entered by the operator from the operating means 35 into the control apparatus 3, the control means 31, at step n8, issues receipt by giving the input paid-in information to the receipt issuing means 39. The issued receipt is converted into image data, and is given to the control means 31. The control means 31 sends the image data to the facsimile apparatus 1, by pressing, for example, key F3 of the function setting keys 35b provided in the operating means 35.

At step n9, the control means 31 transmits updating data of the paid number for storing in the memory means 18a of the memory 18 to the control means 11 of the facsimile apparatus 1, and, at step n10, sends out an initializing signal for initializing the billing state data set and registered in the memory means 18b.

At step n7, on the other hand, if the paid-in information is not entered, advancing to step n11, in a predetermined period after sending out the billing state data, a billing signal is sent to the facsimile apparatus 1. The billing signal contains the date and the unprocessed signal.

Figure 6:
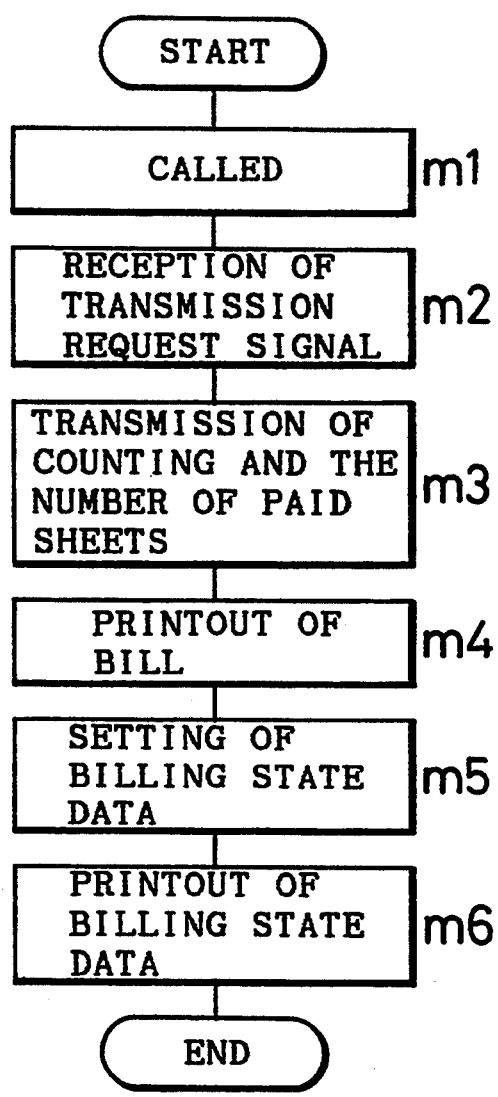
FIG. 6 is a flow chart for explaining the operation in maintenance charge billing in the facsimile apparatus 1.

FIG. 6 is a flow chart showing the operation of the facsimile apparatus 1 in settling and billing of maintenance charge. When called from the control apparatus 3 at step m1 and the transmission request signal sent out from the control apparatus 3 is received at step m2, the control means 11, at step m3, transmits the count of the sheet counter 19 and the paid number in the memory region 18a to the control apparatus 3. As a result, the calculation of the billing amount Y at step n4 is conducted in the control apparatus 3.

At step m4, receiving the image data which is the bill sent from the control apparatus 3, the image data is printed out by the recording means 14, so that a bill is issued. The user of the facsimile apparatus 1 pays the billing amount Y according to the bill, to the maintenance service company to which the maintenance control of the facsimile apparatus 1 is commissioned.

At step m5, receiving the billing state data transmitted from the control apparatus 3, it is set and registered in the memory region 18b of the memory 18. At step m6, the set and registered billing state data is printed out by the recording means 14. As a result, the user of the facsimile apparatus 1 knows what data has been set and registered in the memory region 18b in the memory 18 at the time of billing of the maintenance charge.

FIG. 7 is a flow chart showing the operation of the facsimile apparatus 1 after the billing of the maintenance charge, and FIG. 7(A) shows the operation when the maintenance charge is paid, and FIG. 7(B) is the case when the maintenance charge is not paid.

Referring first to FIG. 7(A), when the billing amount Y of the maintenance charge is paid to the maintenance service company according to the bill sent from the control apparatus 3, the operation after step n7 in FIG. 4 is executed by the control apparatus 3.

That is, at step d1, the image data is received from the control apparatus 3, and the image data is printed out by the recording means 14, so that the receipt is issued. At step d2, on the basis of the paid count sent from the control apparatus 3, the control means 1 I updates the paid number in the memory region 18a of the memory 18. In this updating, the number of sheets corresponding to the recorded sheets equivalent to the paid maintenance charge, and the paid date are stored.

At step d3, the billing state data is initialized. This initialization is effected by adding the initialization data and date to the billing state data.

If, referring then to FIG. 7(B), the maintenance charge is not paid, at step d 11, the billing signal from the control apparatus 3 is received, and the operation goes to step d12.

At step d12, calling the billing state data stored in the memory means 18b in the memory 18, it is printed out by the recording means 14. Thus, the control apparatus 3 notifies the user of the facsimile apparatus 1 that the payment of the maintenance charge has not been made, and the payment of the maintenance charge may be requested.

At step d13, counting the number of times of receiving the billing signals from the control apparatus 3, at step d14, it is determined whether the number of billing times has reached a specified value or not. If reaching the specified value, advancing to step d15. The recording means 14 is deactivated to warn the user of the facsimile apparatus 1. Hence, the maintenance charge may be collected securely.

Figure 8:
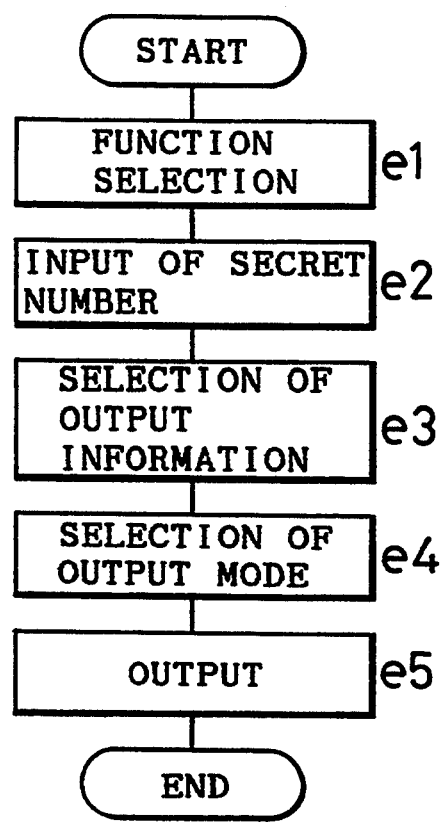
FIG. 8 is a flow chart for explaining the operation of the facsimile apparatus 1.

FIG. 8 is a flow chart for explaining other operations of the facsimile apparatus 1. In the facsimile apparatus 1, the paid number and billing state data are stored in the memory regions 18a, 18b of the memory 18 by the control apparatus 3 as mentioned above. However, it is inconvenient if reading or rewriting of the memory content can be done only by control from the control apparatus 3, and it may be necessary that the serviceman can check the memory content at the time of maintenance and checking and notify the user. If the facsimile apparatus 1 of this embodiment, therefore, corresponding to the predetermined key operation from the operating means 15, the memory content may be printed or displayed.

At step e1, by manipulating the function setting key 15b by the operating means 15, the read mode of the memory content is selected. At step e2, by entering the secret number, it is possible to read out the memory content. At step e3, the memory content to be put out is selected. The output information includes the counting of the sheet counter 19, paid number and date in the memory region 18a, and billing state data in the memory region 18b. At step e4, the output mode is selected. The output mode is either printed out by the recording means 14 or displayed by the display means 16. At step e5, for example, by pressing the start key, the selected information is produced in the selected mode.

In this way, various information necessary for maintenance charge control may be read out and produced as required by the serviceman from the facsimile apparatus 1, so that the maintenance charge may be negotiated with the user.

Thus, according to the embodiment, the personal communication between the facsimile apparatus 1 and the control apparatus 3 sites, that is, between the user and the maintenance service company may be minimized, and the procedure of control of maintenance charge, billing, settling and receipt issuing can be simplified. As a result, the maintenance control of the facsimile apparatus 1 may be done more smoothly, which is convenient for both the user of the facsimile apparatus 1, and the maintenance service company responsible for maintenance control of the facsimile apparatus 1.

FIG. 9 is a block diagram showing a constitution in which a copier 81 is connected to the facsimile apparatus 1. The copier 81 has a control unit 82 realized by a microcomputer and others, and is connected with a reading unit 83 for optically reading the document image, and a copying unit 84 for copying the read document image on a recording paper, and is designed to copy the document. The number of copies made by the copying unit 84 is counted by a sheet counter 88. The control unit 82 is connected with a detector 85 for detecting the operating state (abnormal state) of the copier 81, and the abnormal state detected by the detector 85 is displayed in a display unit 86, and in the event of trouble that must be transmitted to the control apparatus 3 at the maintenance service company, the information expressing the trouble is applied to an interface circuit 10 of the facsimile 1 through an interface circuit 87.

The control unit 82 is connected with a memory 89, and the memory 89 offers, as in the facsimile apparatus 1, a paid number memory region for storing the number of sheets of paid maintenance charge, and a billing state memory region for storing the billing state, such as the number of sheets corresponding to the unpaid maintenance charge.

In the facsimile apparatus 1, the information expressing the abnormal state to be given to the interface circuit 10, and the information expressing the abnormal state of the facsimile apparatus 1 itself detected by the detector 17 are selectively transmitted to the control apparatus 3 through the communication control unit 12. That is, the information given to the interface circuit 10 is the information given from the copier 81, and is the information that must be always transmitted, and hence all the input information is transmitted to the control apparatus 3.

The abnormal state detected by the detector 17 is classified into the trouble that can be handled by the user, and the trouble that requires call of a serviceman, and only in the event of the trouble requiring the serviceman, is the information transmitted to the control apparatus 3. In the interface circuit 10, a predetermined address is given, and the information is transmitted to the control apparatus 3 together with the address. The control apparatus 3 determines whether the received information is from the facsimile apparatus 1 or the copier 81, depending on the address.

In the copier 81, to which the facsimile apparatus 1 is related, the information relating to the maintenance charge can be read and rewritten from the control apparatus 3 according to the same procedure as in the case of the facsimile apparatus 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile apparatus connected to a maintenance charge control apparatus for communicating and determining maintenance charges associated with the facsimile apparatus by way of public telephone networks, said facsimile apparatus comprising:

means for recording image data on a recording paper,
   means for counting the number of sheets recorded by the recording means,
   means for storing a number of sheets corresponding to a previously paid maintenance charge, and
   means for controlling for causing the transmitting of the count of the counting means to said maintenance charge control apparatus, and for causing the storing of said number of sheets corresponding to the paid maintenance charge received from the maintenance charge control apparatus in the storing mean,
   said maintenance charge controlling apparatus including:
   means for causing the transmission of the count of said counting means from the facsimile apparatus, and for storing the received count,
   maintenance charge calculating means for calculating the maintenance charge on the basis of a basic charge, the number of previously paid sheets and the received count
   bill issuing means responsive to said maintenance charge calculating means for preparing a bill on the basis of the calculated maintenance charge and converting said bill into bill image data and transmitting the bill image data to said facsimile apparatus,
   input means for entering the amount of a maintenance charge paid by the user of the facsimile apparatus,
   receipt issuing means responsive to said input means for converting a receipt prepared on the basis of the entered amount into receipt image data and transmitting the receipt image data to said facsimile apparatus, and
   means responsive to said receipt issuing means for transmitting the number of sheets corresponding to the paid maintenance charge to said storing means of the facsimile apparatus.

2. The apparatus as claimed in claim 1, wherein the facsimile apparatus further comprises input means and display means, and
   the controlling means causes the stored number in the means for storing to be displayed on the display means, in response to a predetermined operation by the input means.

3. The apparatus as claimed in claim 1 wherein a billing amount Y included in said bill is calculated in accordance with the equation $$Y = B + k(N - n0)$$

where B is a basic maintenance charge, k is a unit price per recorded sheet, N is the count of the means for counting and n0 is the number of previously paid sheets.

4. A facsimile apparatus connected to a maintenance charge control apparatus for communicating through public telephone networks for determining and communicating maintenance charges associated with the repair and operation of the facsimile apparatus, comprising:

means for recording image data on sheets of recording paper,
   means for counting the number of sheets recorded by the recording means,
   first means in said facsimile apparatus for storing the number of sheets corresponding to previously paid maintenance charges, second means in said facsimile apparatus for storing billing data including the number of sheets corresponding to unpaid maintenance charges, and control means in said facsimile apparatus for controlling the transmitting of the count of the counting means and the number stored in the first storing means in response to a transmission request signal from the maintenance charge control apparatus, and for controlling the storing of the number corresponding to the paid maintenance charges and billing data that are received from the maintenance charge control apparatus in the first storing means and second storing means, respectively.

5. The apparatus as claimed in claim 4, wherein the control means causes said means for recording to record the stored billing data, when the billing data received from the maintenance charge control apparatus is stored in the second storing means.

6. The apparatus as claimed in claim 5, wherein the control means includes means for counting the number of receptions of the billing data received from the maintenance charge control apparatus stored in the second storing means, and means for deactivating at least the recording means when the number of receptions reaches a predetermined number.

7. The apparatus as claimed in claim 4, wherein the facsimile apparatus further comprises input means and display means, and the control means responds to a predetermined operation of the input means when a security number is input, and controls the output of the counting means, the stored content of the first storing means, and the stored content of the second storing means, by selectively causing the recording of the count and the stored contents using the recording means or by causing the visual display of the count and stored contents on the display means.

* * * * *

UNITED STATES PATENT AND TRADEMARK OFFICE
CERTIFICATE OF CORRECTION

PATENT NO. : 5,381,242
DATED : JANUARY 10, 1995
INVENTOR(S) : YOSHIHARU FUJII

It is certified that error appears in the above-indentified patent and that said Letters Patent is hereby corrected as shown below:

On the title page:

Item [75], the city of the inventor should read  -- Sakurai --.

Signed and Sealed this

Tenth Day of October, 1995

*Attest:*

BRUCE LEHMAN

*Attesting Officer*     *Commissioner of Patents and Trademarks*